Patented May 27, 1930

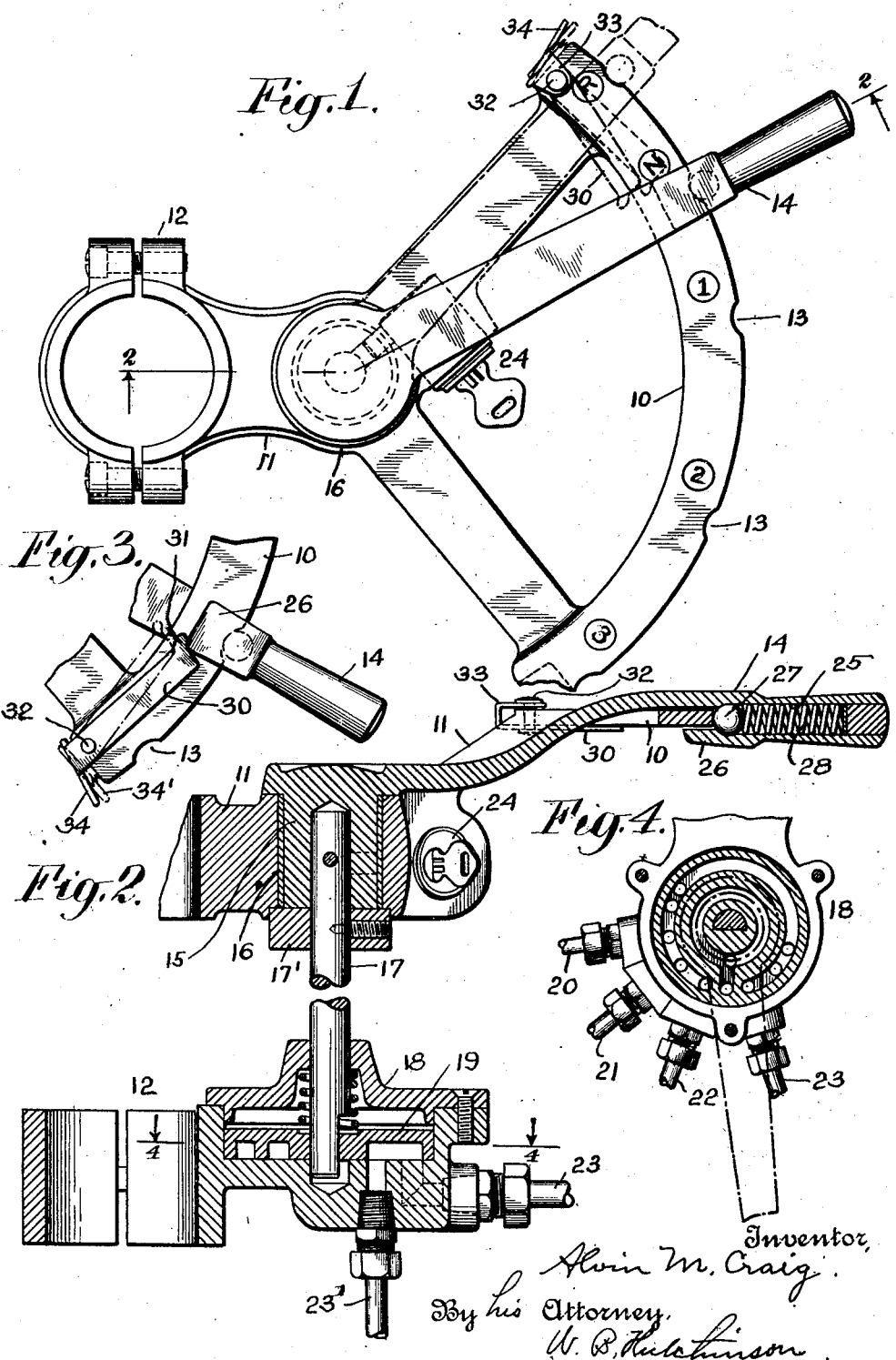

1,760,347

UNITED STATES PATENT OFFICE

ALVIN M. CRAIG, OF NEW HAVEN, CONNECTICUT, ASSIGNOR TO UNIVERSAL GEAR SHIFT CORPORATION, A CORPORATION OF DELAWARE

VALVE-CONTROL HANDLE AND LOCK FOR MOTOR CARS

Application filed December 10, 1926. Serial No. 153,795.

My invention relates to improvements in the construction, mounting and locking of a valve control handle which is used in connection with automobiles, and particularly in a position near the steering wheel, for the purpose of controlling some valve, and more particularly a valve for shifting gears, although it can be used for other purposes. My invention is intended to produce a valve control handle which is mounted conveniently to the steering wheel, and which in its movement controls the position of the machine gears. In such a construction it is possible sometimes to move the handle into position to shift the gears to reverse accidentally, and sometimes with disastrous effect. My invention is intended to provide a detent which will normally prevent any such movement of the handle, but which can be released by the operator by a simple touch of the finger when manipulating the handle so as to permit the movement to reverse position.

The invention is also intended to mount and arrange the control handle or lever so that it and the quadrant on which it operates can be safely carried on the steering rod and rotated as a whole therewith, and yet has the handle pivoted independently of the steering rod so that it can by no possibility interfere with the free manipulation of the rod, or prevent easy access to any connected parts. The invention is further intended to mount the quadrant and control handle in such a manner that the handle can be smoothly and easily operated, will automatically lock itself in any desired position but so as to be easily released, and in which the parts are constructed to withstand rather rough usage without injury. The invention can be used to advantage in controlling a pneumatic valve in the type of gear shift mechanism shown in my application for Letters Patent of the United States Serial No. 107,592, filed May 8th, 1926, but the invention is not limited to any such use, and the quadrant, handle, and lock or detent therefor can be used on many types of valve control. These and other advantages will be better understood from the following description.

Reference is to be had to the accompanying drawings forming a part of this specification, in which similar reference characters indicate corresponding parts in all the views.

Figure 1 is a broken plan view of my invention as adapted for attachment to a steering rod.

Figure 2 is a broken vertical section on the line 2—2 of Figure 1.

Figure 3 is a broken inverted plan of a part of the handle, quadrant, and the detent on the quadrant, and Figure 4 is a section on the line 4—4 of Figure 2.

My invention is intended for use in connection with a suitable quadrant, as for example 10, which is rigid on and as illustrated forms a part of the bracket 11, and this is adapted to be attached by a clamp 12, or its equivalent to the steering rod of a machine. The quadrant is adapted to lie at substantially right angles to the steering rod, and in practice would usually be just below the steering wheel, to the end that the driver can manipulate readily the valve control handle 14 which moves over the quadrant 10 and which is adapted to be positioned in one of the notches 13 on the edge of the quadrant, these notches in the example given representing first, second, third, neutral and reverse positions. That is to say while the handle is positioned in the notch 1, the gear shift will be changed to first position; when in the notch N, it will be in neutral position; and when in the notch R in reverse. Obviously there can be any number of these positions, and the notches might represent something else than the position of the gear shifts without affecting the invention.

The handle 14 is not pivoted on the steering rod as is the case with many handles for somewhat analogous purposes, although the bracket 11 is carried by the steering rod, but by having the handle entirely independent of the rod, any possible interference therewith is avoided, and the handle can only serve its purpose of positioning a certain part. As shown the handle has a substantial bearing 15 which is journaled as shown at 16 in the bracket 11, and the part 15 of the handle is rigidly secured to a valve rod 17, while a collar 17' on the rod also serves to close the lower end of the bearing 16, and as this collar fits into a corresponding socket in the bracket 11, and as the top of the bearing 15 overlaps said bracket, it will be seen that a very tight, firm, but easily operating joint is made which is also waterproof.

In the example given the valve rod 17 operates a pneumatic valve 18 having a member 19 controlling the valve ports leading to the pipes 20, 21, 22, 23 and 23'. The function of these it is not necessary to discuss here because they have nothing to do with the invention, but in a pneumatic gear shift the valve 19 is moved so as to direct the pressure or suction as desired.

In the drawing I have also shown a lock 24 which is used on the machine to lock the valve handle and mechanism against use, and so serves as an anti-theft lock. This forms no part of the present invention and is only referred to in order to avoid confusion.

The handle 14 is curved upward between the quadrant 10 and the clamp 12 so as to overlie the quadrant 10 and project beyond its outer edge, the hand grip portion being thus arranged to lie substantially parallel with the steering wheel of the machine, and having a chamber 25 and a lug 26 which overlaps the lower side of the quadrant 10 as shown in Figure 2 so that the handle is guided above and below the quadrant so as to have a smooth and at the same time firm connection therewith.

It will be observed that as the handle 14 is moved to each of its temporary fixed positions opposite the several notches 13, the ball 27 will engage the appropriate notch and prevent the handle from moving out accidentally; but when the handle is forcibly moved the ball 27 will move against the spring 28 so as to slide out of its notch. But if through inadvertence, accident or mistake, the driver attempts to move the handle into the reverse position, the movement will be checked by the detent 30 which lies on the under side of the quadrant near one end and adjacent the reverse notch, and prevent any such movement. This detent has its free end 31 (see Figure 3) shaped to engage the lug 26 to prevent such movement, and the detent is pivoted as shown at 32 to the quadrant 10 near one end of the latter, and has on the upper side a clip 33, both clip and detent body merging into the finger piece 34 which projects beyond the outer edge of the quadrant and is normally pressed by a spring 34' to move the detent into position to engage the clip 26 as shown in Figure 3. If, however, the driver has the real purpose of moving the lever or handle to reverse position, he can with his thumb or finger press on the finger piece 34 so as to swing the detent 30 out of the path of the lug 26 or the handle 14 of which the lug forms a part, so as to permit the necessary movement of the handle, but this it will be observed requires a positive conscious act on the part of the driver so that the movement can only be accomplished with intent.

I am aware that there have been locks against reverse as applied to various handle mechanism, but the particular arrangement which I have shown is simple, positive, and easily manipulated when desired to free the handle, and I also wish to call attention to the fact that the general mounting of the quadrant, handle, and detent is such as to insure a stable structure capable of smooth efficient use and convenient mounting on but without interference with the steering rod.

I claim:—

1. A structure of the kind described comprising a quadrant, a handle movable freely over the quadrant for the major portion of its length, and a detent pivoted at one end of and straddling the quadrant and manually releasable beyond the latter and within easy reach of the handle and arranged to normally prevent the movement of the handle to a certain position with respect to the quadrant.

2. A structure of the kind described comprising a bracket adapted for attachment to the steering rod of a motor car, a quadrant rigid on the bracket, a handle pivoted on the bracket and movable over the quadrant, a lug on the handle and projected beneath the quadrant, and means pivotally supported at one end of the quadrant and having a portion lying beneath the quadrant in the path of movement of the lug to limit the handle in its movement in one direction.

3. In an attachment of the kind described, a bracket having a clamp for detachable mounting of the bracket upon a steering column, a quadrant on the bracket, an operating lever pivoted in the bracket between the clamp and quadrant and movable over the latter, a lug on the lever and extending beneath the quadrant, and a detent pivotally engaged with one end of the quadrant in straddling relation thereto and having a free end beneath the quadrant and projected into the path of the lug to coact therewith for limiting the movement of the lever in one direction.

In testimony whereof, I have signed my name to this specification this 8th day of December, 1926.

ALVIN M. CRAIG.